United States Patent

[11] 3,612,409

| [72] | Inventor | Raymond C. Henning |
| | | 205 El Cerrito Drive, Bakersfield, Calif. 93305 |
| [21] | Appl. No. | 867,557 |
| [22] | Filed | Oct. 20, 1969 |
| [45] | Patented | Oct. 12, 1971 |

[54] QUICK-CONNECTING, SELF-SEALING FLEXIBLE HOSE NOZZLE
5 Claims, 6 Drawing Figs.

[52] U.S. Cl. ................................................. 239/602,
222/570, 239/597, 239/601, 239/DIG. 19,
285/260, 285/DIG. 22
[51] Int. Cl. ..................................................... B05b 1/00
[50] Field of Search............................................ 239/DIG.
19, 602, 601, 599, 597; 222/569, 570; 285/260,
DIG. 22

[56] References Cited
UNITED STATES PATENTS

| 2,098,128 | 11/1937 | Bailey.......................... | 222/569 X |
| 2,543,909 | 3/1951 | Hatheway, Jr................ | 222/569 X |
| 3,033,470 | 5/1962 | Choitz......................... | 239/601 X |
| 3,129,894 | 4/1964 | Schermerhorn.............. | 239/597 X |
| 3,419,220 | 12/1968 | Goodwin et al.............. | 239/601 X |
| 3,486,503 | 12/1969 | Porter et al.................. | 222/568 X |
| 2,326,292 | 8/1943 | Dorman ...................... | 285/DIG. 22 |
| 2,366,067 | 12/1944 | Smith........................... | 285/260 X |
| 2,785,016 | 3/1957 | Vollertzen et al. .......... | 239/576 X |
| 3,016,605 | 1/1962 | Heckethorn.................. | 239/576 X |

*Primary Examiner*—M. Henson Wood, Jr.
*Assistant Examiner*—Reinhold W. Thieme
*Attorney*—Vergil L. Gerard ABSTRACT: An elongated hose nozzle of resilient material adapted to be attached quickly and conveniently to the male-threaded coupling at one end of a garden hose is the essence of this disclosure. The nozzle has an inner end and an outer end. The inner end has a cylindrical periphery adapted to fit through the opening in the coupling, which includes an in-turned flange terminating in a circular opening. A bead of torus form circumscribes the nozzle at its inner end and extends radially outwardly to a dimension greater than that of the cylindrical periphery of the nozzle. A frustoconical passage is formed longitudinally through the nozzle with its greater dimension at the inner end, thus forming a thin wall at the inner end of the nozzle. The thin wall permits the bead and inner end of the nozzle to be resiliently collapsed by hand to a smaller diameter for insertion through the circular opening and past the internal flange into the coupling, where the thin wall of the nozzle is released and resiliently expands towards its normal shape bringing it into locking engagement with the flange and opening in the coupling.

PATENTED OCT 12 1971 3,612,409

RAYMOND C. HENNING
INVENTOR

Virgil L. Gerard
ATTORNEYS

QUICK-CONNECTING, SELF-SEALING FLEXIBLE HOSE NOZZLE

BACKGROUND OF THE INVENTION

It is well known in the art of hose nozzles to provide a metal or brass nozzle that screws onto a male-threaded coupling of a garden hose. In order to prevent leaking between the nozzle and the hose coupling, a sealing washer must be placed between two mating surfaces. These sealing washers deteriorate, in time, and must be replaced. Furthermore, screwing the nozzle on and off the hose coupling is highly inconvenient, and sometimes requires a tool in order to tighten the nozzle sufficiently onto the coupling to prevent leaking.

Also, nozzles of this type are often adjustable to alter the character of the spray in a manner which impedes the flow of the water and reduces the force of the stream issuing from the nozzle.

SUMMARY OF THE INVENTION

A primary object of the present invention is to provide a hose nozzle which can be quickly and conveniently attached and detached with a garden hose.

Another object of the invention is to provide a hose nozzle of a resilient material which is sufficiently flexible at its attachment end to permit its manual collapse for insertion into and engagement with the inside surfaces of a garden hose coupling, but is sufficiently rigid at its nozzle end to retain a predetermined orifice configuration.

A further object is to provide a hose nozzle of the type described which has a circular bead of larger diameter than the opening in the hose coupling extending radially outward from the nozzle periphery and disposed adjacent a relatively thin wall which is manually collapsible, of approximately the diameter of the opening, both the bead and wall being collapsible to pass through the coupling opening and resiliently reformable to engage the bead internally of the coupling and the wall with the periphery of the opening. It is still a further object of the invention to provide in a hose nozzle of the type described, a smooth, tapering, and uninterrupted passage longitudinally therethrough whereby a more forceful stream of water issues from the nozzle end.

Still another object of the invention is to provide a hose nozzle of the type described in which the attachable end of the nozzle extends through the opening of the coupling and engages the internal coupling surfaces in such a manner that the pressure of water passing through the hose and nozzle urges intimate sealing contact between the engaged portions of the nozzle and coupling.

Other objects and advantages of my invention will become apparent from the following detailed description of preferred embodiments thereof, and the accompanying drawing in which.

Figure 1:
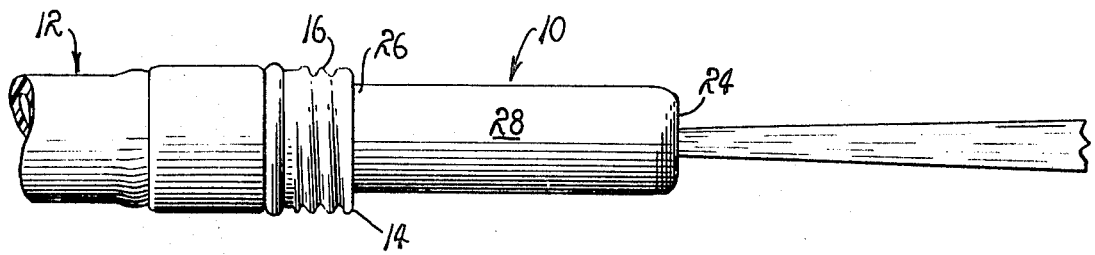
FIG. 1 is a side elevational view of a nozzle of the construction of my invention attached to the end of a garden hose.
Figure 2:
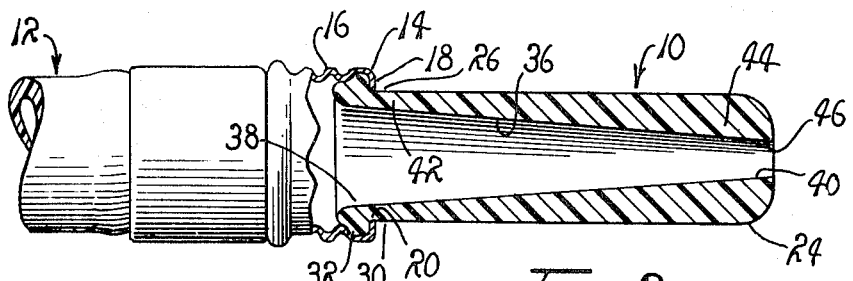
FIG. 2 is a view similar to FIG. 1, but with the nozzle and a portion of the hose shown in section.
Figure 3:
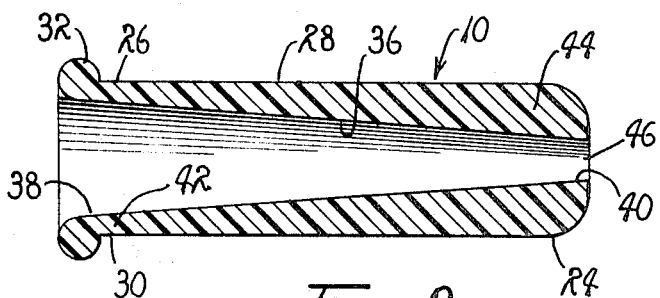
FIG. 3 is a longitudinal section view of the nozzle.
Figure 4:
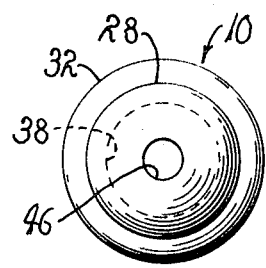
FIG. 4 is an end view of the nozzle from the discharge end.

Referring more particularly to the details of the invention as shown in the drawing, FIGS. 1 and 2 show a hose nozzle 10 of my invention attached to the discharge end of a standard garden hose 12. The garden hose 12 has a conventional threaded male coupling 14 at its discharge end made of sheet metal with an external threaded portion 16 and an inturned flange 18. The threaded portion 16 of the coupling is adapted to receive the internally threaded portion of a conventional nozzle. The inturned flange 18 of the coupling terminates to form a circular opening 20.

The nozzle 10 is made of resilient, flexible material, such as rubber or plastic, and is elongated in form with a cylindrical outer surface 28. The nozzle has an outer end 24 and and inner end 26. The external diameter 30 of the nozzle is substantially that of the opening 20 in the coupling 14. Formed integrally with the inner end 26 of the nozzle is a bead 32 of torus or O-ring form, which extends radially outwardly from the outer surface 28 of the nozzle to a greater diameter than that of the opening 20. When the inner end 26 of the nozzle is assembled with the coupling 14, the bead 32 rests behind the inturned flange 18.

To provide for the flow of water through the nozzle, an internal axial frustoconical passage 36 is formed longitudinally through the nozzle, with a larger diameter portion 38 located at the inner end 26 and a smaller diameter portion 40 at the outer end 24 of the nozzle. The frustoconical shape of the passage 36 provides a thin inner wall 42 and the inner wall 42 at the inner end 26 of the nozzle adjacent to the bead 32 and relatively thicker outer wall 44 at the outer end 24 of the nozzle. The inner wall 42 is sufficiently thin to permit the inner end of the nozzle to be collapsed manually or expanded by water pressure in the hose and nozzle passage 36. At the outer end 24 of the nozzle, the passage 36 forms a discharge orifice 46 which shapes the stream of water issuing therefrom. In the embodiment shown by FIGS. 1 through 4 the orifice 46 is cylindrical and shapes the water stream into a jet.

Figure 5:
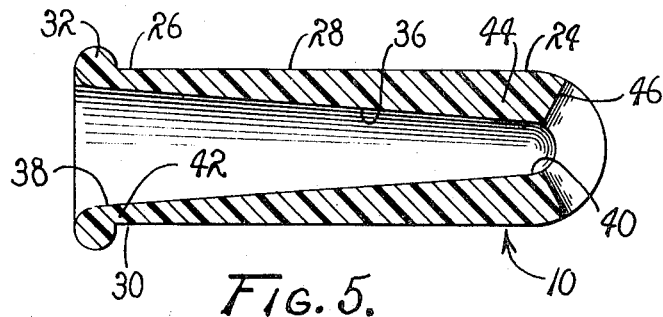
FIG. 5 is a longitudinal section view of a modified form of my invention.
Figure 6:
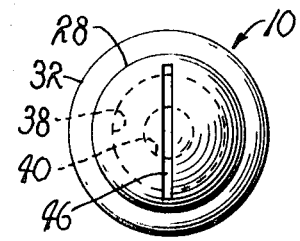
FIG. 6 is an end view of the nozzle shown in FIG. 5 from the discharge end.

FIGS. 5 and 6 show an alternate form of the invention in which the orifice 46 is a narrow slit which forms the stream of water issuing therefrom into a fan shaped spray.

OPERATION

To assemble the nozzle 10 with the hose coupling 14 the thin inner wall 42 is manually deformed to collapse the inner end 26 and bead 32 to a size small enough to pass through the opening 20 of the coupling. The inner wall 42 is then released and the inner end 26 of the nozzle returns to its original shape bringing the outer surface 28 of the nozzle into engagement with the periphery of the opening 20 and the bead 32 into a nesting position behind the inturned flange 18 of the male coupling 14. When water under pressure is passed through the hose and nozzle 10, it forces the bead 32 tightly against the inner surface of the flange 18, and, inasmuch as the inner wall 42 of the nozzle is relatively thin, the water pressure in the passage 36 expands the inner wall 42 causing it to bulge slightly just outwardly of the coupling opening 20. The expansion of the inner wall 42 captures the periphery of the opening 20 in the coupling between the bead 32 and the bulging portion of the nozzle wall and the nozzle is thus tightly sealed in the opening and held by the bead 32 against axial movement out of coupling.

Since the outer wall 44 is substantially thicker than the inner wall 42 by reason of the frustoconical shape of passage 36 through the nozzle, it is not deformed by the water pressure but maintains its original shape and causes the water passing through to orifice 46 to form a stream of whatever shape the contour of the orifice dictates. Further variations in the character of the water stream can be temporarily achieved by resiliently deforming the outer end of the nozzle and orifice 46 manually. Inasmuch as the inner surface of the nozzle is smooth and uninterrupted, the water flows freely therethrough, thereby providing a more forceful stream than is otherwise obtainable.

To detach the nozzle 10 from the hose coupling 14, the water is turned off and the inner wall 42 is again manually deformed to collapse the inner end 26 to a size small enough to release bead 32 from the coupling flange 18. When the water is off release can also be achieved by merely bending the nozzle to a position substantially at right angles to the coupling bore and withdrawing it.

From this description, it will be understood that for effective operation of my nozzle, its structural characteristics must be correlated with the characteristics of the material from which it is formed. Particularly, the actual thickness of both the inner wall 42 and the outer wall 44 and, to some extent, the cross-sectional diameter of the bead 32, will depend on the degree of flexibility and resilience inherent in the material used to form the nozzle.

It should also be understood that a nozzle formed in accordance with this invention will be quite inexpensive, highly durable, lightweight, nonabrasive and extremely simple to use.

I claim:

1. A hose nozzle for use on a hose having a threaded male end coupling with a terminal annular flange radially inturned to form a coupling output opening, comprising:
    an elongated body of resiliently flexible material having an inner end and an outer end, said body having an outer surface of substantially the same size and contour as said coupling output opening;
    an annular bead formed integral with the outer surface adjacent the inner end of said body and extending radially outward therefrom to form a periphery of substantially the same size and contour as the inside of said coupling;
    means defining a bore disposed coaxially through said body from said inner end to said outer end, said bore being tapered to form an inner end wall having a relatively thin radial thickness, said inner end wall being sufficiently thin to permit manual deformation of said inner end radially inward to reduce said inner end and bead periphery to a size and shape smaller than the size and shape of said coupling output opening and thereby permit insertion of said inner end and bead into said coupling through said coupling output opening, and said outer end wall being sufficiently thick to resist substantial manual deformation;
    means defining an orifice interconnected with said bore-defining means adjacent the outer end of said body, said orifice-defining means being shaped to impart predetermined characteristics to a stream of fluid passing therethrough; and
    means defining an annular impinging surface on the inner end of said body flaring radially outwardly and axially inwardly from the innermost end of said bore into confluence with the peripheral surface of said annular bead, said impinging surface being disposed for impingement thereupon by fluid passing through said coupling in a direction which forces said annular bead radially outwardly and axially outwardly into gripping engagement with the inside of said coupling and annular flange.

2. A hose nozzle of the type described in claim 1, in which:
    said body material, inner end wall, and bead have correlated characteristics which cooperate to permit manual deformation of said inner end and bead to a size and configuration sufficient to permit insertion of said inner end and bead into said coupling through said coupling output opening, resilient reforming to engage the inside of said coupling, and further radially outward resilient expansion upon exertion of pressure from fluid passing through said coupling and bore-defining means; and
    said bore-defining means is so tapered as to restrict the flow of fluid therethrough and cause the exertion of pressure from said fluid upon said inner end wall and bead.

3. A hose nozzle of the type described in claim 2, in which:
    said body outer surface is cylindrical over its entire length and has a diameter substantially the same as the diameter of said coupling output opening, which is also circular;
    said bead is torudial in shape and has a circular periphery of substantially the same diameter as the diameter of said coupling, which is cylindrical; and
    said impinging surface has a radially outermost periphery of substantially the same size and contour as said body outer surface.

4. A hose nozzle of the type described in claim 2, in which:
    said outer end wall is sufficiently thick to resist substantial manual deformation, but sufficiently thin to permit slight manual distortion of said orifice-defining means.

5. A hose nozzle of the type described in claim 1, in which:
    said body outer surface is cylindrical over its entire length and has a diameter substantially the same as the diameter of said coupling output opening, which is also circular;
    said bore-defining means defines a frustoconical passage having its larger end disposed adjacent the inner end of said body and its smaller end disposed adjacent the outer end of said body and having a taper correlated with the resiliency characteristics and diameter of said bead and body to provide an inner end wall which is sufficiently thin and resiliently flexible to permit substantial manual deformation of said inner end and bead to the degree necessary to allow passage of said inner end and bead through said coupling output opening, resilient reformation thereof into intimate contact with the inner surface of said coupling, and resilient expansion thereof into sealing engagement with said coupling output opening and the inner surface of said coupling upon exposure to back pressure provided by the restriction of the flow of fluid through said passage resulting from said taper which is sufficiently thick and rigid to prevent substantial manual deformation of said outer end but permit slight manual distortion of said orifice-defining means; and
    said impinging surface is generally curvilinear and has a radially outermost periphery of substantially the same size and contour as said body outer surface.